(12) United States Patent
Scacchi et al.

(10) Patent No.: US 10,516,472 B2
(45) Date of Patent: Dec. 24, 2019

(54) DEVICE FOR TRANSFERRING INFORMATION FROM AN AVIONICS SYSTEM OF AN AIRCRAFT TO AN INDEPENDENT COMPUTER

(71) Applicants: AIRBUS OPERATIONS (S.A.S.), Toulouse (FR); AIRBUS (S.A.S.), Blagnac (FR)

(72) Inventors: Pierre Scacchi, Toulouse (FR); Thomas Stanislawiak, Plaisance du Touch (FR); Marc Audibert, Brax (FR); Raphaël Renier, Colomiers (FR); Pierre Depape, Paulhac (FR); Martial Pohin, Plaisance du Touch (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 193 days.

(21) Appl. No.: 15/650,350

(22) Filed: Jul. 14, 2017

(65) Prior Publication Data

US 2018/0026706 A1 Jan. 25, 2018

(30) Foreign Application Priority Data

Jul. 19, 2016 (FR) ..................... 16 56855

(51) Int. Cl.
*H04B 7/185* (2006.01)
*G08G 5/00* (2006.01)
(Continued)

(52) U.S. Cl.
CPC ....... *H04B 7/18506* (2013.01); *G08G 5/0008* (2013.01); *G08G 5/0013* (2013.01);
(Continued)

(58) Field of Classification Search
CPC .. G08G 5/0008; G08G 5/0013; G08G 5/0021; H04W 84/06; H04W 84/12; H04H 20/62
See application file for complete search history.

(56) References Cited

U.S. PATENT DOCUMENTS 9,716,862 B1 * 7/2017 Evans ................... B64C 39/024
2006/0238384 A1 10/2006 Hess et al.
(Continued)

FOREIGN PATENT DOCUMENTS

EP 2706423 A2 3/2014
WO WO 2015/001112 A1 1/2015

OTHER PUBLICATIONS

French Search Report for Application No. 1656855 dated May 4, 2017.

*Primary Examiner* — Mussa A Shaawat
(74) *Attorney, Agent, or Firm* — Jenkins, Wilson, Taylor & Hunt, P.A.

(57) ABSTRACT

A device and system for transferring information from an avionics system of an aircraft to an independent computer. The device can be embedded onboard an aircraft for transferring information arising from an avionics system from the aircraft to a computer independent of the avionics system. The device includes at least one radiofrequency receiver configured to receive information which arises from the avionics system and is emitted destined for the ground or another aircraft, at least one transmitter, and a processing unit to command the transmission by the transmitter, to the computer, of at least some of the information received by the radiofrequency receiver.

9 Claims, 2 Drawing Sheets

(51) Int. Cl.
*H04W 84/06* (2009.01)
*H04H 20/62* (2008.01)
*H04W 84/12* (2009.01)

(52) U.S. Cl.
CPC .......... *G08G 5/0021* (2013.01); *H04W 84/06* (2013.01); *H04H 20/62* (2013.01); *H04W 84/12* (2013.01)

(56) References Cited

U.S. PATENT DOCUMENTS

| | | | |
|---|---|---|---|
| 2013/0062457 A1* | 3/2013 | Deakin | B64B 1/08 |
| | | | 244/25 |
| 2014/0074322 A1* | 3/2014 | Baumgarten | G05B 23/0216 |
| | | | 701/3 |
| 2016/0373184 A1* | 12/2016 | Oder | G06F 9/45533 |
| 2017/0148340 A1* | 5/2017 | Popa-Simil | G09B 9/48 |

* cited by examiner

DEVICE FOR TRANSFERRING INFORMATION FROM AN AVIONICS SYSTEM OF AN AIRCRAFT TO AN INDEPENDENT COMPUTER

CROSS-REFERENCE TO RELATED APPLICATION

This application claims priority to co-pending French Patent Application FR 16 56855, filed Jul. 19, 2016, the content of which is incorporated by reference herein in its entirety.

TECHNICAL FIELD

The disclosure herein relates to the field of the communication of information from an avionics system of an aircraft to a computer embedded onboard the aircraft and independent of the avionics system.

BACKGROUND

Aircraft comprise a set of computers, called avionics computers, tasked with controlling their operation. This set of computers generally comprises a flight management computer of FMS ("Flight Management System") type, a flight control computer, for example of FCS ("Flight Control System") type or of PRIM ("PRIMary Computer") and SEC (SECondary Computer") types, a maintenance computer of CMC ("Central Maintenance Computer") type, an alerts management computer of FWS ("Flight Warning System") type, etc.

In modern aircraft, pilots sometimes use a computer called EFB ("Electronic Flight Bag"). The latter is independent of the avionics computers and it is used by pilots to implement software provided by the airline, which does not need to form the subject of certification by air safety authorities, such as the software embedded in avionics computers. An EFB computer may for example correspond to a laptop or to a tablet. Certain software used on the EFB computer uses information relating to the flight of the aircraft, such as its flight plan, its current position, or to its performance such as its weight, etc. In the case of a so-called class I EFB computer (totally independent of the aircraft's avionics computers), a pilot must read this information on a screen of the cockpit of the aircraft and input it manually into the EFB computer, this being constraining. In the case of a so-called class II or class III EFB computer, this EFB computer is independent of the aircraft's avionics computers in the sense that it cannot communicate freely with the avionics computers, but a unidirectional link is sometimes provided from an avionics computer to the EFB computer. Thus, this avionics computer can dispatch information to the EFB computer without any risk of its operation being disturbed by the EFB computer. The dispatching of the information from the avionics computer to the EFB computer can be carried out automatically, for example cyclically, or on the request of a pilot. However, such a mode of operation requires that the aircraft be equipped with a link from the avionics computer to the EFB computer. Such a link is difficult to implement if provision was not made for it during the design of the aircraft. Moreover, it must form the subject of a certification by the air certification authorities and its cost is relatively high.

SUMMARY

An aim of the present disclosure is in particular to afford a solution to these problems. It relates to a device that can be embedded onboard an aircraft for transferring information arising from an avionics system from the aircraft to a computer independent of the avionics system.

This device is noteworthy in that it is independent of the avionics system of the aircraft and in that it comprises:
  at least one radiofrequency receiver configured to receive, when the device is embedded onboard the aircraft, information which arises from the avionics system and is emitted by a radiofrequency emitter of the aircraft destined for the ground or another aircraft;
  at least one transmitter; and
  a processing unit configured to command the transmission by the transmitter, to the computer independent of the avionics system, of at least some of the information received by the radiofrequency receiver.

Thus, the computer independent of the avionics system can receive information originating from the avionics system without it being necessary to make provision for a unidirectional link from the avionics system to this independent computer. Since the device is independent of the aircraft's avionics system, it can be used even in an aircraft in which no provision is made during the design of the aircraft for the transmission of information from an avionics computer to an independent computer such as this. There is no risk that the acquisition, by the device, of the information originating from the avionics computer, will disturb the operation of the avionics computer, since the device merely receives, by virtue of its radiofrequency receiver, information transmitted by the aircraft to the ground or to another aircraft.

According to particular embodiments that may be taken into account in isolation or in combination:
  the device comprises a radiofrequency receiver of VHF type;
  the device comprises a radiofrequency receiver of ADS-B type;
  the transmitter is a radiofrequency emitter of WiFi® type or of Bluetooth® type;
  the device furthermore comprises a VHF emitter and the processing unit is configured to dispatch requests to the aircraft by the VHF emitter;
  the device furthermore comprises a sensor and the processing unit is configured to acquire signals arising from the sensor and to determine information in respect of position and/or attitude of the aircraft as a function of the signals. In an advantageous manner, the processing unit is configured to verify whether information in respect of position and/or attitude of the aircraft has been received by the at least one radiofrequency receiver more recently than a predetermined duration ago, if so, to command the transmission by the transmitter of at least some of the aircraft's position and/or attitude information received by the at least one radiofrequency receiver and, if not so, to command the transmission by the transmitter of at least some of the aircraft's position and/or attitude information determined as a function of the signals arising from the sensor.

The disclosure herein also relates to a system embedded onboard an aircraft comprising a computer independent of avionics computers of the aircraft, as well as a device such as mentioned above, the computer being configured to acquire information relating to the aircraft, provided by the device.

In an embodiment, the computer independent of the avionics computers of the aircraft is a computer of EFB type.

BRIEF DESCRIPTION OF THE DRAWINGS

The disclosure herein will be better understood on reading the description which follows and on examining the appended figures.

DETAILED DESCRIPTION

Figure 2:
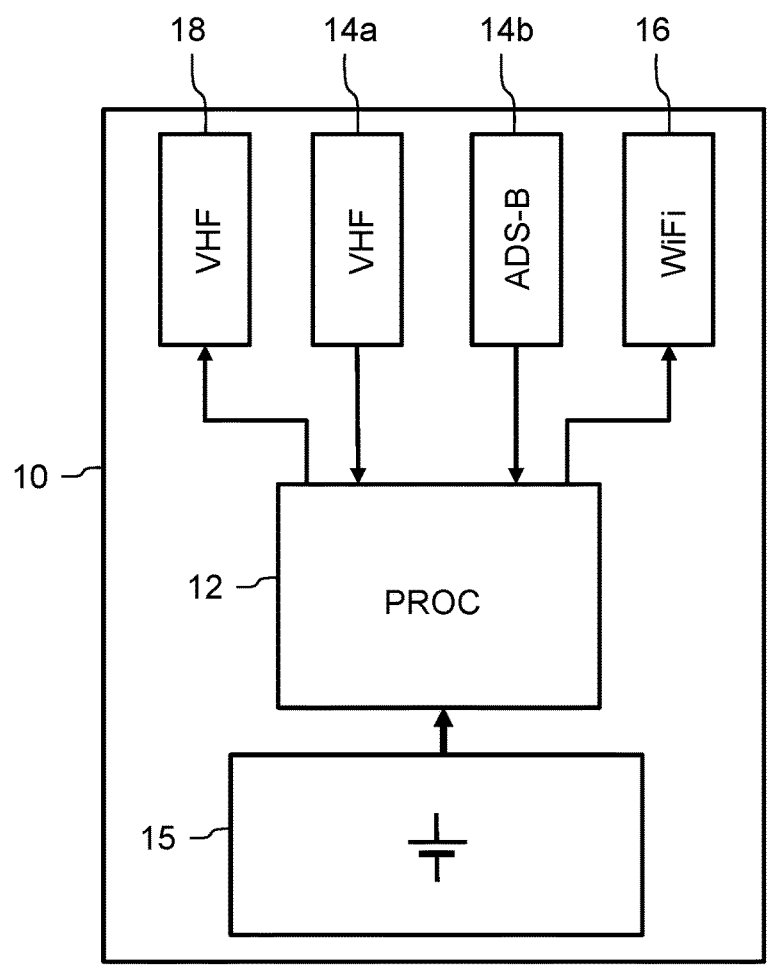
FIG. 2 represents in a schematic manner a device that can be embedded onboard an aircraft, in accordance with an embodiment of the disclosure herein.

The device 10 that can be embedded onboard an aircraft, represented in FIG. 2, comprises a processing unit 12, labeled PROC in the figure. This processing unit comprises a processor, for example a microprocessor or a microcontroller. The device 10 also comprises at least one radiofrequency receiver, in particular a receiver 14a of VHF ("Very High Frequency") type and a receiver 14b of ADS-B ("Automatic Dependant Surveillance-Broadcast") type. It also comprises a transmitter 16. In a first variant, the transmitter 16 is of the radiofrequency type, for example of WiFi® type or of Bluetooth® type. In a second variant, the transmitter 16 corresponds to a wired transmitter, for example of Ethernet type or of USB® type. The receivers 14a and 14b are linked to the processing unit 12, as is the transmitter 16.

Figure 1:
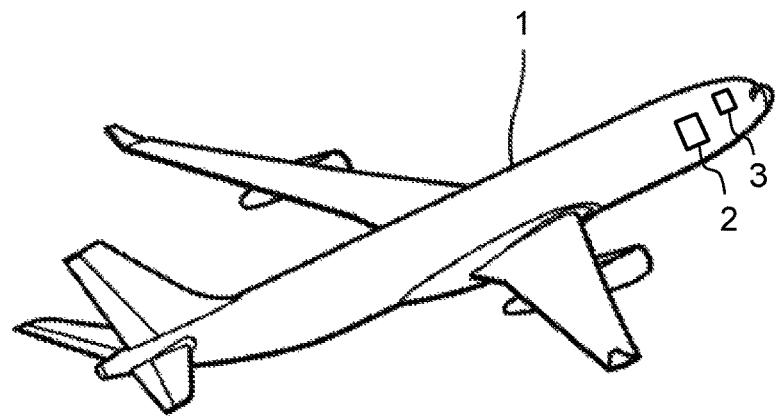
FIG. 1 illustrates an aircraft onboard which a device in accordance with an embodiment of the disclosure herein can be embedded.

In operation, when the device 10 is embedded onboard an aircraft 1 such as that represented in FIG. 1, the receiver 14a of VHF type receives information transmitted by a VHF antenna of the aircraft in particular destined for the ground. The receiver 14b of ADS-B type receives information transmitted by an antenna of the aircraft in particular destined for other aircraft. The processing unit 12 acquires the information received by the receivers 14a and 14b and it commands the transmission of at least some of the information by the transmitter 16, for example of WiFi® type.

Figure 3:
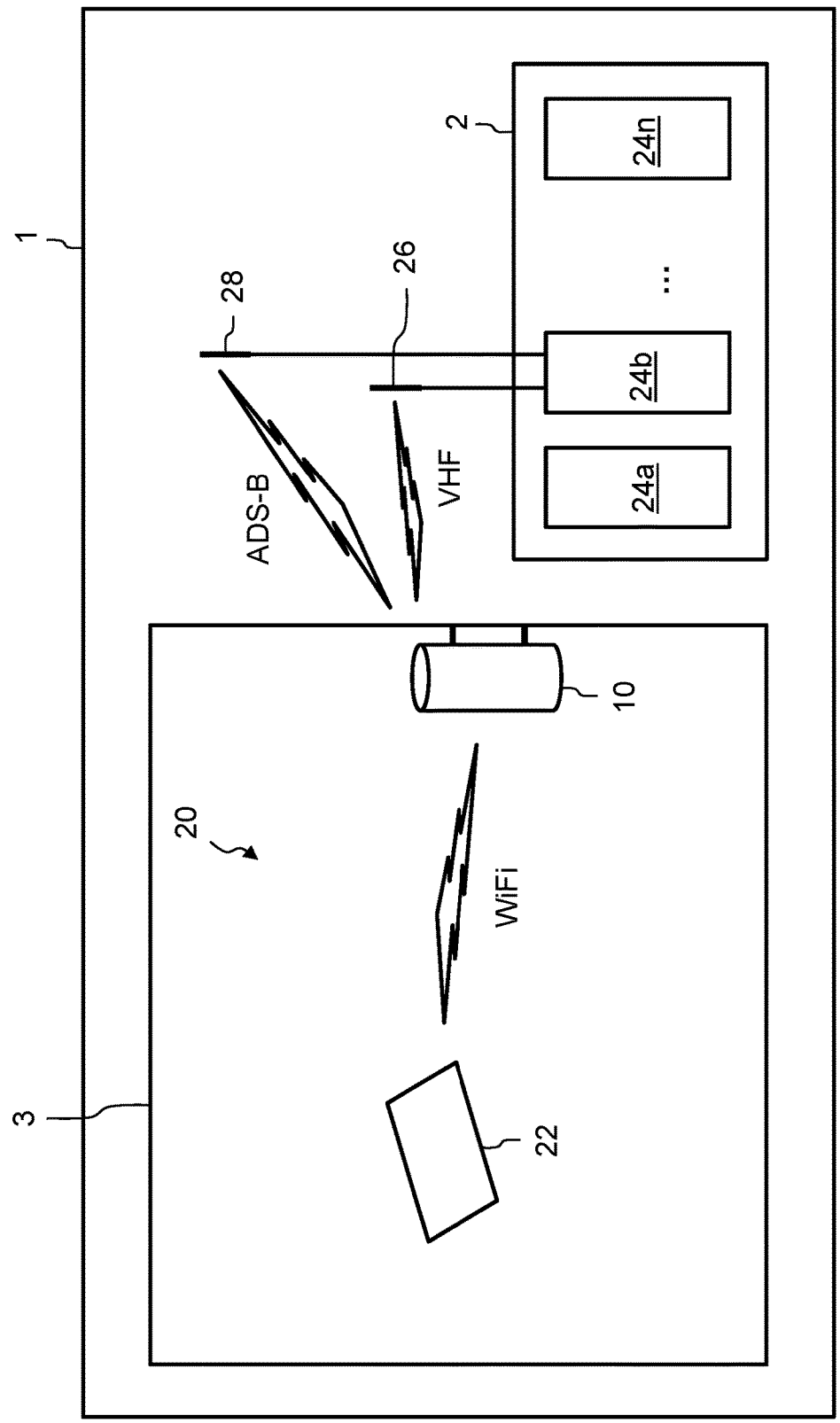
FIG. 3 represents in a schematic manner a system embedded onboard an aircraft, in accordance with an embodiment of the disclosure herein.

FIG. 3 allows a better understanding of an exemplary use of the device 10 in an aircraft 1. The device 10 is disposed in a cockpit 3 of the aircraft. The aircraft comprises a set of avionics computers 24a, 24b . . . 24n disposed in an avionics bay 2 of the aircraft. A computer 22 independent of the avionics computers is disposed in the cockpit of the aircraft. This computer 22 corresponds for example to a computer of EFB type used by a pilot of the aircraft. It is able to communicate by a Wifi® link. At least one of the avionics computers, for example a flight management computer 24b of FMS type, is configured to transmit information to the ground or to other aircraft. Accordingly, it is hooked up to at least one radiofrequency transmitter, for example a transmitter of VHF type linked to an antenna 26 and a transmitter of ADS-B type linked to an antenna 28. These antennas are for example situated on the fuselage of the aircraft. In a particular manner, these transmitters are linked to a computer for managing the communications of the aircraft and the computer 24b transmits the information via this communications management computer. In operation, when the avionics computer 24b transmits information to the ground and/or to other aircraft, the antennas 26 and/or 28 emit radiofrequency signals corresponding to this information. These radiofrequency signals, although intended principally for a ground reception center or for other aircraft, are received by the radiofrequency receivers 14a of VHF type and 14b of ADSB type of the device 10 situated in the cockpit of the aircraft. The processing unit 12 acquires from the receivers the information transmitted by the avionics computer 24b via the antennas 26 and 28. The processing unit 12 then commands the transmission of at least some of the information by the transmitter 16 of WiFi® type and this information is received by the computer 22 of EFB type. Thus, the computer 22 of EFB type receives information transmitted by the avionics computer 24b by virtue of the device 10, without it being necessary to make provision for a specific link from the computer 24b to the computer 22, the latter remaining independent of the aircraft's avionics computers.

In an advantageous manner, in addition to the transmitter 16 of WiFi® type, the device 10 comprises a receiver of WiFi® type (not represented in FIG. 2). This makes it possible to establish a bidirectional WiFi® link between the computer 22 of EFB type and the device 10. Thus, in a particular embodiment, the processing unit 12 records in a memory the data received from the avionics computer 24b and the computer 22 of EFB type dispatches requests to the device 10 to ask that particular data be dispatched. These requests are received by the processing unit 12 which verifies whether these particular data are recorded in the memory and, if so, dispatches them to the computer 22 of EFB type. In an advantageous manner, the device 10 comprises software of server type making it possible to manage the responses to the requests of the computer 22 of EFB type, then considered to be a client of the server.

In a particular embodiment, the device 10 furthermore comprises a VHF transmitter 18, linked to the processing unit 12. This allows the processing unit to dispatch requests to the aircraft to ask that information be dispatched by the avionics computer 24b. These requests are similar to those which could be dispatched by a ground control center. These requests are for example requests of ACARS ("Aircraft Communication Addressing and Reporting System") type. They correspond for example to asking for a flight plan of the aircraft, etc. Thus, if the processing unit 12 receives a request from the computer 22 of EFB type asking it to dispatch information not available in the memory, if there exists a type of request making it possible to ask that the information be dispatched by the aircraft, the processing unit 12 dispatches such a request to the aircraft. When the processing unit 12 receives the corresponding information from the avionics computer 24b, the unit transmits it to the computer 22 of EFB type. Such a mode of operation makes it possible to request information from the avionics computer 24b but without requiring complex and expensive installation of a secure specific link. Given that the request is dispatched to the aircraft, by the device 10, in the same way as if it were dispatched by a ground control center, no particular certification procedure is required and there is no risk of such a request disturbing the operation of the avionics computer 24b.

In an advantageous manner, the device 10 furthermore comprises at least one sensor, for example a magnetic or inertial sensor, a GNSS ("Global Navigation Satellite System") signal receiver in particular of GPS ("Global Positioning System") type, etc. The processing unit is configured to acquire signals arising from the sensor and to determine information in respect of position and/or attitude of the aircraft as a function of the signals. In a particular exemplary embodiment, the processing unit is configured to verify whether information in respect of position and/or attitude of the aircraft has been received by the at least one radiofrequency receiver more recently than a predetermined duration ago, for example 1 minute, in particular by the radiofrequency receiver 14b of ADS-B type. If so, the processing unit commands the transmission, by the transmitter 16, of at least some of the aircraft's position and/or attitude information received by the at least one radiofrequency receiver, destined for the computer 22 of EFB type. Otherwise, the processing unit commands the transmission, by the transmitter 16, of at least some of the aircraft's position and/or attitude information determined as a function of the signals arising from the sensor. Thus, even if the device 10 does not receive any recent position or attitude information about the aircraft through the radiofrequency receiver, it can nevertheless determine the information, although with lesser precision, and transmit it to the computer 22 of EFB type.

In a particular embodiment, the device 10 furthermore comprises a connector, corresponding to a communication port of the processing unit 12. This connector is for example of Ethernet RJ45 type or of USB type. It makes it possible to establish a communication between the device 10 and another item of equipment in order to update software of the device 10 or to retrieve, by virtue of this other item of equipment, information recorded in a memory of the device 10.

In another particular embodiment, the processing unit 12 is configured to acquire from the radiofrequency receiver 14b of ADS-B type, information received from an aircraft other than the aircraft 1. The device 10 can thus transmit, to the computer 22 of EFB type, information relating to the traffic of aircraft situated in proximity to the aircraft 1.

In yet another particular embodiment, the device 10 furthermore comprises a WiFi® receiver (not represented in FIG. 2) comprising an antenna whose gain is sufficiently high to receive radiofrequency signals originating from the passenger cabin of the aircraft when the device 10 is situated in the cockpit 3. The processing unit 12 is then configured to acquire information originating from the WiFi® receiver and to command the retransmission of the information by the transmitter 16. The computer 22 of EFB type can thus communicate on a WiFi® network of the passenger cabin, the communication being relayed by the device 10, even if the level of the radiofrequency signals originating from the passenger cabin is not sufficient to be received directly by the computer 22.

In an advantageous embodiment, the device 10 comprises a battery 15, such as represented in FIG. 2. This allows entirely autonomous operation of the device 10 in the cockpit of the aircraft 1. The device 10 is then fitted with a connector making it possible to hook up a battery charger.

In a particular manner, the device 10 is integrated into a casing of cylindrical shape, preferably of circular cross-section. This makes it possible to place the device 10 in a housing of the cockpit 3 similar to a housing provided for receiving an extinguisher.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device configured for embedding onboard an aircraft and configured for transferring information received from an avionics system of the aircraft to a computer independent of the avionics system, the device comprising:
   at least one radiofrequency receiver configured to receive, when the device is embedded onboard the aircraft, information which arises from the avionics system and is emitted by a radiofrequency emitter of the aircraft destined for ground or another aircraft;
   at least one sensor;
   at least one transmitter; and
   a processing unit configured to command transmission by the transmitter, to the computer independent of the avionics system, of at least some of the information received by the radiofrequency receiver;
   wherein the device is independent of the avionics system of the aircraft;
   wherein the processing unit is configured to acquire signals arising from the at least one sensor and to determine information in respect of position and/or attitude of the aircraft as a function of the signals; and
   wherein the processing unit is configured to determine whether information in respect of position and/or attitude of the aircraft has been received by the at least one radiofrequency receiver more recently than a predetermined duration ago.

2. The device as claimed in claim 1, wherein the radiofrequency receiver is a VHF type radiofrequency receiver.

3. The device as claimed in claim 1, wherein the radiofrequency receiver is a ADS-B type radiofrequency receiver.

4. The device as claimed in claim 1, wherein the transmitter is a radiofrequency emitter of WiFi® type or of Bluetooth® type.

5. The device as claimed in claim 1, further comprising a VHF emitter and wherein the processing unit is configured to dispatch requests to the aircraft by a VHF emitter.

6. The device as claimed in claim 1, wherein the processing unit is further configured to command the transmission by the transmitter of at least some of the aircraft's position and/or attitude information received by the at least one radiofrequency receiver if information in respect of position and/or attitude of the aircraft has been received by the at least one radiofrequency receiver more recently than the predetermined duration ago; and
    wherein the processing unit is further configured to command the transmission by the transmitter of at least some of the aircraft's position and/or attitude information determined as a function of the signals arising from the at least one sensor if information in respect of position and/or attitude of the aircraft has not been received by the at least one radiofrequency receiver more recently than the predetermined duration ago.

7. A system embedded onboard an aircraft and comprising a computer independent of avionics computers of the aircraft, as well as a device onboard the aircraft configured for transferring information received from an avionics system of the aircraft to the computer independent of the avionics system, the device comprising:
    at least one radiofrequency receiver configured to receive, when the device is embedded onboard the aircraft, information which arises from the avionics system and is emitted by a radiofrequency emitter of the aircraft destined for ground or another aircraft;
    at least one transmitter;
    at least one sensor;
    a processing unit configured to command transmission by the transmitter, to the computer independent of the avionics system, of at least some of the information received by the radiofrequency receiver; and
    the computer being configured to acquire information relating to the aircraft, provided by the device;
    wherein the device is independent of the avionics system of the aircraft;
    wherein the processing unit is configured to acquire signals arising from the at least one sensor and to determine information in respect of position and/or attitude of the aircraft as a function of the signals; and
    wherein the processing unit is configured to determine whether information in respect of position and/or attitude of the aircraft has been received by the at least one radiofrequency receiver more recently than a predetermined duration ago.

8. The system embedded onboard as claimed in claim 7, wherein the computer independent of the avionics computers of the aircraft is a computer of EFB type.

9. The system as claimed in claim 7, wherein the processing unit is further configured to command the transmission by the transmitter of at least some of the aircraft's position and/or attitude information received by the at least one radiofrequency receiver if information in respect of position and/or attitude of the aircraft has been received by the at least one radiofrequency receiver more recently than the predetermined duration ago; and
    wherein the processing unit is further configured to command the transmission by the transmitter of at least some of the aircraft's position and/or attitude information determined as a function of the signals arising from the at least one sensor if information in respect of position and/or attitude of the aircraft has not been received by the at least one radiofrequency receiver more recently than the predetermined duration ago.

* * * * *